United States Patent
Oberheide et al.

(10) Patent No.: US 9,998,282 B2
(45) Date of Patent: Jun. 12, 2018

(54) SYSTEM AND METHODS FOR OPPORTUNISTIC CRYPTOGRAPHIC KEY MANAGEMENT ON AN ELECTRONIC DEVICE

(71) Applicant: Duo Security, Inc., Ann Arbor, MI (US)

(72) Inventors: Jon Oberheide, Ann Arbor, MI (US); Douglas Song, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days. days.

(21) Appl. No.: 15/689,912

(22) Filed: Aug. 29, 2017

(65) Prior Publication Data

US 2018/0006812 A1    Jan. 4, 2018

Related U.S. Application Data

(63) Continuation of application No. 14/524,758, filed on Oct. 27, 2014, now Pat. No. 9,774,448.

(60) Provisional application No. 61/897,598, filed on Oct. 30, 2013.

(51) Int. Cl.
*H04L 9/08* (2006.01)

(52) U.S. Cl.
CPC ......... *H04L 9/0861* (2013.01); *H04L 9/0869* (2013.01); *H04L 9/0897* (2013.01)

(58) Field of Classification Search
CPC .... H04L 9/0861; H04L 9/0897; H04L 9/0869
See application file for complete search history.

(56) References Cited

U.S. PATENT DOCUMENTS

| | | |
|---|---|---|
| 5,870,723 A | 2/1999 | Pare, Jr. et al. |
| 6,119,096 A | 9/2000 | Mann et al. |
| 6,209,091 B1 | 3/2001 | Sudia et al. |
| 6,311,272 B1 | 10/2001 | Gressel |
| 6,758,394 B2 | 7/2004 | Maskatiya et al. |
| 6,823,359 B1 | 11/2004 | Heidingsfeld et al. |
| 6,934,858 B2 | 8/2005 | Woodhill |
| 6,996,716 B1 | 2/2006 | Hsu |
| 7,000,247 B2 | 2/2006 | Banzhof |
| 7,093,133 B2 | 8/2006 | Hopkins et al. |
| 7,172,115 B2 | 2/2007 | Lauden |
| 7,340,600 B1 | 3/2008 | Corella |
| D571,282 S | 6/2008 | Murata et al. |

(Continued)

FOREIGN PATENT DOCUMENTS

EP    2639997    9/2013

OTHER PUBLICATIONS

Edge, Kenneth, et al. "The use of attack and protection trees to analyze security for an online banking system." System Sciences, 2007. HICSS 2007. 40th Annual Hawaii International Conference on. IEEE, 2007.

(Continued)

*Primary Examiner* — Matthew Smithers
(74) *Attorney, Agent, or Firm* — Jeffrey Schox; Padowithz Alce

(57) ABSTRACT

A system and method for opportunistic cryptographic key management includes generating a security capability assessment on a first electronic device based on security capabilities of the device, selecting a key management mode based on the security capability assessment, generating a cryptographic key based on the key management mode, and storing the cryptographic key based on the key management mode.

20 Claims, 6 Drawing Sheets

(56) References Cited

U.S. PATENT DOCUMENTS

| | | |
|---|---|---|
| 7,386,720 B2 | 6/2008 | Sandhu et al. |
| 7,447,784 B2 | 11/2008 | Eun |
| 7,463,637 B2 | 12/2008 | Bou-Diab et al. |
| 7,496,662 B1 | 2/2009 | Roesch et al. |
| 7,571,471 B2 | 8/2009 | Sandhu et al. |
| 7,574,733 B2 | 8/2009 | Woodhill |
| 7,630,493 B2 | 12/2009 | Sandhu et al. |
| 7,711,122 B2 | 5/2010 | Allen et al. |
| 7,716,240 B2 | 5/2010 | Lim |
| 7,793,110 B2 | 9/2010 | Durfee et al. |
| 7,836,501 B2 | 11/2010 | Sobel et al. |
| 7,958,362 B2 | 6/2011 | Hwang |
| 7,982,595 B2 | 7/2011 | Hanna et al. |
| 7,983,987 B2 | 7/2011 | Kranzley et al. |
| 8,010,779 B2 | 8/2011 | Sermersheim et al. |
| 8,028,329 B2 | 9/2011 | Whitcomb |
| 8,099,368 B2 | 1/2012 | Coulter et al. |
| 8,136,148 B1 | 3/2012 | Chayanam et al. |
| 8,141,146 B2 | 3/2012 | Ozeki |
| 8,151,333 B2 | 4/2012 | Zhu et al. |
| 8,161,527 B2 | 4/2012 | Curren |
| 8,185,744 B2 | 5/2012 | Brown et al. |
| 8,200,980 B1 | 6/2012 | Robinson et al. |
| 8,225,392 B2 | 7/2012 | Dubrovsky et al. |
| 8,259,947 B2 | 9/2012 | Rose et al. |
| 8,332,627 B1 | 12/2012 | Matthews et al. |
| 8,381,297 B2 | 2/2013 | Touboul |
| 8,397,301 B2 | 3/2013 | Hering et al. |
| 8,402,526 B2 | 3/2013 | Ahn |
| 8,484,708 B2 | 7/2013 | Chern |
| 8,495,720 B2 | 7/2013 | Counterman |
| 8,499,149 B2 | 7/2013 | Chen |
| 8,499,339 B2 | 7/2013 | Chao et al. |
| 8,510,820 B2 | 8/2013 | Oberheide et al. |
| 8,522,010 B2 | 8/2013 | Ozzie et al. |
| 8,533,841 B2 | 9/2013 | Kulkarni et al. |
| 8,538,028 B2 | 9/2013 | Yeap et al. |
| 8,539,567 B1 | 9/2013 | Logue et al. |
| 8,548,426 B2 | 10/2013 | Smith |
| 8,578,162 B2 | 11/2013 | Jentzsch et al. |
| 8,595,822 B2 | 11/2013 | Schrecker et al. |
| 8,601,554 B2 | 12/2013 | Gordon et al. |
| 8,612,305 B2 | 12/2013 | Dominguez et al. |
| 8,646,060 B1 | 2/2014 | Ben Ayed |
| 8,667,288 B2 | 3/2014 | Yavuz |
| 8,713,639 B2 | 4/2014 | Cheeniyil et al. |
| 8,719,930 B2 | 5/2014 | Lapsley et al. |
| 8,732,839 B2 | 5/2014 | Hohl |
| 8,737,623 B2 | 5/2014 | Hart |
| 8,745,703 B2 | 6/2014 | Lambert et al. |
| 8,751,801 B2 | 6/2014 | Harris et al. |
| 8,756,698 B2 | 6/2014 | Sidagni |
| 8,806,609 B2 | 8/2014 | Gladstone et al. |
| 8,891,772 B2 | 11/2014 | D Souza et al. |
| 8,909,926 B2 | 12/2014 | Brandt et al. |
| 8,949,596 B2 | 2/2015 | Yin et al. |
| 8,949,927 B2 | 2/2015 | Arnott et al. |
| 9,049,011 B1 | 6/2015 | Agrawal |
| 9,049,594 B2 | 6/2015 | Chen et al. |
| 9,071,611 B2 | 6/2015 | Yadav et al. |
| 9,076,343 B2 | 7/2015 | Chaar et al. |
| 9,118,656 B2 | 8/2015 | Ting et al. |
| 9,122,888 B2 | 9/2015 | Devi |
| 9,135,458 B1 | 9/2015 | Hankins, Jr. et al. |
| 9,154,387 B2 | 10/2015 | Maki et al. |
| 9,203,841 B2 | 12/2015 | Neuman et al. |
| 9,223,961 B1 | 12/2015 | Sokolov |
| 9,225,840 B2 | 12/2015 | Malatack et al. |
| 9,253,185 B2 | 2/2016 | Alaranta et al. |
| 9,258,296 B2 | 2/2016 | Juthani |
| 9,282,085 B2 | 3/2016 | Oberheide et al. |
| 9,338,156 B2 | 5/2016 | Oberheide et al. |
| 9,338,163 B2 | 5/2016 | Wendling et al. |
| 9,386,003 B2 | 7/2016 | Kumar |
| 9,391,980 B1 | 7/2016 | Krahn et al. |
| 9,430,938 B2 | 8/2016 | Proud |
| 9,443,084 B2 | 9/2016 | Nice et al. |
| 9,479,509 B2 | 10/2016 | Zeuthen |
| 9,659,160 B2 | 5/2017 | Ligatti et al. |
| 9,668,137 B2 | 5/2017 | Sigurdson et al. |
| 9,706,410 B2 | 7/2017 | Sreenivas et al. |
| 2002/0013898 A1 | 1/2002 | Sudia et al. |
| 2002/0136410 A1 | 9/2002 | Hanna |
| 2003/0061506 A1 | 3/2003 | Cooper et al. |
| 2004/0139312 A1 | 7/2004 | Medvinsky |
| 2006/0031938 A1 | 2/2006 | Choi |
| 2006/0059569 A1 | 3/2006 | Dasgupta et al. |
| 2007/0297607 A1 | 12/2007 | Ogura et al. |
| 2008/0229104 A1 | 9/2008 | Ju et al. |
| 2009/0271863 A1 | 10/2009 | Govindavajhala et al. |
| 2010/0023781 A1 | 1/2010 | Nakamoto |
| 2010/0042954 A1 | 2/2010 | Rosenblatt et al. |
| 2010/0274859 A1 | 10/2010 | Bucuk |
| 2011/0026716 A1 | 2/2011 | Tang et al. |
| 2011/0138469 A1 | 6/2011 | Ye et al. |
| 2011/0197267 A1 | 8/2011 | Gravel et al. |
| 2011/0219449 A1 | 9/2011 | St Neitzel et al. |
| 2012/0227098 A1 | 9/2012 | Obasanjo et al. |
| 2013/0060708 A1 | 3/2013 | Oskolkov et al. |
| 2013/0110676 A1 | 5/2013 | Kobres |
| 2013/0125226 A1 | 5/2013 | Shah et al. |
| 2013/0239168 A1 | 9/2013 | Sreenivas et al. |
| 2013/0246281 A1 | 9/2013 | Yamada et al. |
| 2014/0156473 A1 | 6/2014 | Murphy |
| 2014/0177842 A1 | 6/2014 | Yellepeddy et al. |
| 2014/0201841 A1 | 7/2014 | Deshpande et al. |
| 2014/0244993 A1 | 8/2014 | Chew |
| 2016/0056962 A1 | 2/2016 | Mehtälä |
| 2016/0134418 A1 | 5/2016 | Liu et al. |
| 2016/0164866 A1 | 6/2016 | Oberheide et al. |
| 2016/0165491 A1 | 6/2016 | Liu et al. |
| 2016/0174112 A1 | 6/2016 | Liu et al. |
| 2016/0286391 A1 | 9/2016 | Khan |

OTHER PUBLICATIONS

Goldfeder et al., Securing Bitcoin wallets via a new DSA/ECDSA threshold signature scheme, http://www.cs.princeton.edu/~stevenag/threshold_sigs.pdf.

Neuenhofen, Kay, and Mathew Thompson. "A secure marketplace for mobile java agents." Proceeding of the second international Conference on Autonomous agents. ACM, 1998. (pp. 212-218).

Symantec, Administration guide for symantec Endpoint protection and symantec network access control, 2009, version 11.00.05.00.00.

SYSTEM AND METHODS FOR OPPORTUNISTIC CRYPTOGRAPHIC KEY MANAGEMENT ON AN ELECTRONIC DEVICE

CROSS-REFERENCE TO RELATED APPLICATIONS

This application is a continuation of U.S. patent application Ser. No. 14/524,758, filed 27 Oct. 2014, which claims the benefit of U.S. Provisional Application No. 62/897,598, filed 30 Oct. 2013, both of which are incorporated in their entireties by this reference.

TECHNICAL FIELD

This invention relates generally to the digital signature field, and more specifically to a new and useful system and method for opportunistic cryptographic key management on an electronic device in the digital signature field.

BACKGROUND

As mobile computing devices (smart phones, tablets, wearable computers, and the like) have increased in number and capability, the devices have become increasingly useful for the storage of private data signatures. However, the varying capabilities of mobile devices can make use of such devices challenging when implementing security solutions. Users have different devices, and depending on the device capabilities, the mobile devices have different levels of security. Some advanced mobile devices have specialized hardware and software to enable improved security; however, depending on such features alienates less capable devices and limits the scale at which secure practices can be implemented. In one instance, Google Wallet uses a security element to store credit card credentials. But because the security element is only implemented on a limited number of devices, such a financial mechanism is limited to only capable devices. Thus, there is a need in the digital signature field to create new and useful system and methods for opportunistic cryptographic key management on an electronic device. This invention provides such a new and useful system and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Opportunistic Cryptographic Key Management

Figure 1:
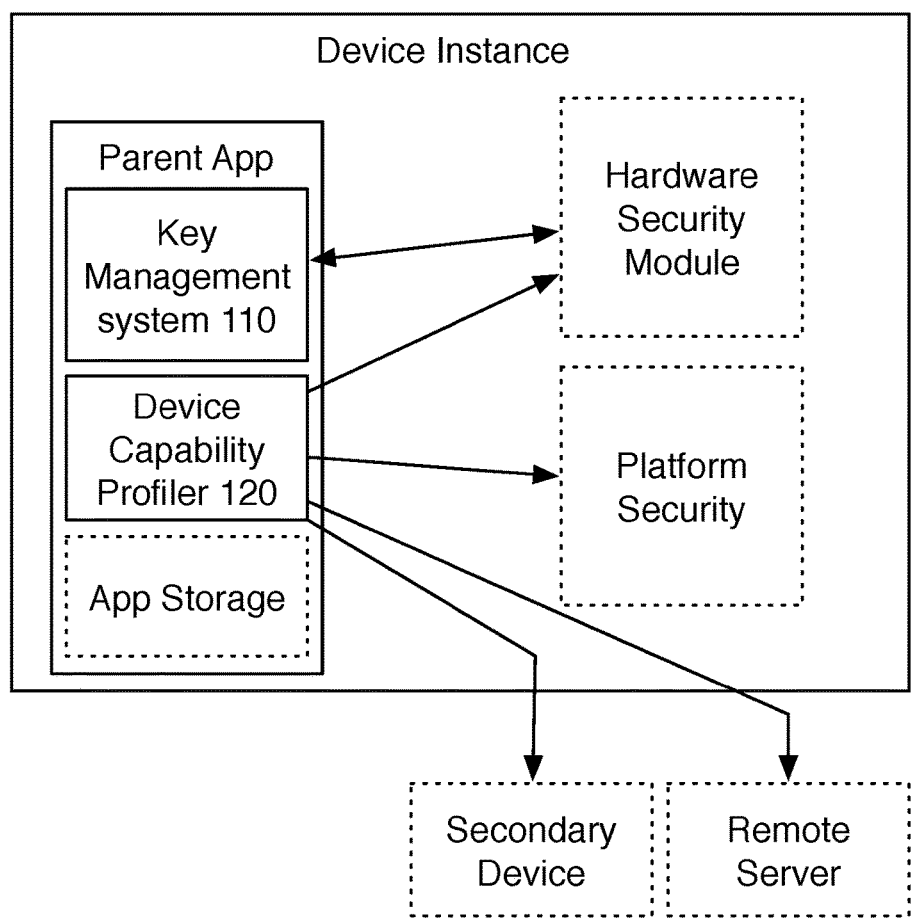
FIG. 1 is a schematic representation of a system of a preferred embodiment.

As shown in FIG. 1, a system for opportunistic cryptographic key management on a device can include a key management system no and a device capability profiler 120. In some variations, the system can further include a remote server and/or a secondary computing device. The system functions to dynamically adjust cryptographic key generation, storage, and usage to take advantage of device security features. The system can be used to provide adaptive key management across a wide variety of devices with individually varying capabilities. The varying capabilities of a device may otherwise cause security to be restricted by the lowest common denominator, but the system can function to adapt security measures appropriately based on device capabilities, enabling devices of varying security capability to share a key management platform. The system can additionally adjust security measures to meet user needs or preferences. The form and scale of encryption, the type and forms of additional factors of authentication, and other security measures can be customized to particular device instances, users, or device types. The system is preferably applied to use-cases involving management of keys of asymmetric key pairs and in particular managing private keys stored on a device. Additionally or alternatively, the system can be used in managing tokens, certificates and other digital keys. When distributed in actual use, instances of the system preferably manage keys of a wide variety of devices.

The key management system 110 functions to enable creation, storage, retrieval, and/or use of cryptographic keys by an electronic device. The key management system 110 preferably provides application logic used to accomplish these ends.

The key management system 110 preferably enables cryptographic key generation using key generation algorithms intended for asymmetric-key encryption algorithms (e.g., RSA), but may additionally or alternatively use key generation algorithms intended for symmetric-key encryption (e.g., DES and AES).

The key management system 110 preferably additionally uses random number generators (RNGs) or pseudo-random number generators (PRNGs) in the key generation process. If the electronic device operating the key management system no includes a hardware RNG, the key management system no preferably uses this RNG, but may additionally or alternatively use any suitable RNG or PRNG. If the electronic device operating the key management system no does not have a dedicated RNG, but is capable of providing potential RNG sources (e.g., radio noise, thermal noise), the key management system 110 preferably uses the RNG sources to generate random numbers. The key management system no may perform any suitable signal processing on RNG sources to extract random numbers, including the use of randomness extractors. If the electronic device operating the key management system no does not have access to RNG sources, the key management system no preferably produces pseudo-random numbers using a PRNG. The PRNG preferably runs on general purpose computing hardware of the electronic device (e.g., a main CPU), but may additionally or alternatively run on more specialized hardware (e.g., a GPU, or hardware dedicated to security functions). Additionally or alternatively, the key management software may obtain random numbers from an external source (e.g., from an internet-connected random number generator).

The key management system 110 may offload some or all of key generation computations to an external source (e.g., an internet-connected key generation server, or a locally connected key generator).

The key management system no can be a sub-module within a parent application; additionally or alternatively, the key management system 110 can be a standalone application running on an electronic device or a sub-module of electronic device operating software or firmware. The key management system no is preferably operative within a native application on a mobile device, but may additionally or alternatively operate within a webapp on a mobile device, or in any other suitable manner.

The key management system 110 preferably enables key storage by managing where and how cryptographic keys are stored. The key management system 110 preferably stores keys in memory on the electronic device running the key management system, but may additionally or alternatively store keys in any suitable location (e.g., a second electronic device, a remote server, etc.). The key management system no may store keys in tamper protected data storage (e.g., key storage of a hardware security module), storage allocated to the key management system no on the electronic device, storage allocated to other applications on the electronic device, storage allocated to the operating system of the electronic device, firmware of electronic device hardware, or in any other suitable location. Keys are preferably stored in a dedicated storage location (e.g., a storage location intended for key storage), but additionally or alternatively, keys may be stored in other storage locations (e.g., inside a database or a file not exclusively dedicated to key storage). If the key management system 110 stores multiple keys, the keys may be stored in the same location or in different locations. Keys are preferably stored whole in a single location, but may additionally or alternatively be stored partially in multiple locations (i.e., no one data location contains the entire key).

The key management system no preferably enables key retrieval by allowing access to keys stored within the key management system. The key management system no may allow direct access to keys (e.g., the unencrypted full key is retrievable), but may additionally or alternatively allow only indirect access to keys (e.g., the key may be used, but data is passed through the key management system no such that the unencrypted key is not revealed). As another example, the key management system no may include allowing access to keys by creating an encrypted version of the key that may be used by persons or applications with appropriate credentials.

The key management system 110 may determine key retrieval access by user or application credentials; e.g., a certain set of credentials may allow direct access to the keys stored in the key management system, while another set of credentials may allow only indirect access to the same keys. Access may be similarly limited to particular sets of keys; e.g., a first set of credentials can access all keys stored in the key management system, while another set of credentials can access only a subset of keys. Additionally, access may be limited to certain types of access; for example, the key management system 110 may allow the key to be transmitted only over encrypted connections. The key management system 110 preferably includes an access configuration utility that allows for configuration of how keys may be accessed; additionally or alternatively, the key management system 110 may manage key access in any suitable manner.

The key management system no preferably enables key usage by allowing for the transmission of keys to the parent app or to other apps; additionally or alternatively, key usage may be enabled in any suitable manner (e.g., performing encryption/decryption within the parent app).

The key management system 110 preferably operates according to a stored system configuration. The system configuration preferably includes key creation configuration data, key storage configuration data, key retrieval configuration data, and/or key usage configuration data. The system configuration preferably directs parameters of key management; e.g., what keys are generated, where keys are generated, how keys are generated, where/how keys are stored, and/or how keys are accessed.

The key management system no preferably enables the system configuration to be automatically adapted based on particular device instance characteristics; e.g., the system configuration may be adapted according to the output of the device capability profiler 120. Devices can differ based on available hardware or software functionality, and based on the system, application, or user configuration of the device. The key management system 110 can augment and adjust the various stages of key management (i.e., generation, storage, retrieval, and/or usage) according to those capabilities. The key management system 110 preferably tracks configuration data for a given key—subsequent interactions employ the appropriate operations. In some variations, key management can depend in part on a secondary device and/or a remote server. Various tasks such as key generation can be delegated or cooperatively performed with a secondary device or remote server. The key management system 110 can include logic to direct communication and interactions with the secondary device and/or remote server.

The key management system no may additionally or alternatively enable manual configuration; e.g., the key management system no may allow user and/or administrator access to all or part of the system configuration. Like access to particular keys, configuration access may be limited to particular persons or applications possessing appropriate credentials, and level of access may similarly be determined by credentials.

The device capability profiler 120 functions to collect, analyze, and assess information about the device to determine security capabilities. The device capability profile preferably runs during an initial setup on the device such as when instantiating the key management system no on a device instance (e.g., when opening an application for a first time), but may additionally or alternatively run at other times to assess any changes or in response to a change in the device capabilities. For example, the setup may run periodically. The device capability profiler 120 preferably checks for a set of hardware capabilities, platform enabled capabilities, qualitative capabilities of a device (e.g., processing speed, storage, etc.), and/or secondary device capabilities and uses these capabilities to generate one or more capability assessments.

Capability assessments preferably include data about the set of capabilities possessed by an assessed device. Capability assessments may include data on the presence or lack of particular capabilities; additionally or alternatively, capability assessments may include data on the strength and/or magnitude of particular capabilities. Capability assessments may be formatted as a list, matrix, or any other type of data format or structure. Capability assessments may include aggregates of capability data or other processed capability data.

In one variation of a preferred embodiment, capability assessments include one or more security capability scores. Capability scores are preferably determined by evaluating capability data against a scoring metric; capability scores are preferably used as an indication of relative security strength (compared to other devices). Scoring metrics may be designed to assess security relative to any suitable reference; for example, a scoring metric might score capabilities of a smartphone on a scale from 1-10, where 10 is considered the ideal smartphone score. Alternatively, a scoring metric might score capabilities of a smartphone on a scale from 1-10, where 10 is considered a preferred security score. The use of scoring metrics based on different references allows security administrators to compare security scores both inter-device-type and intra-device-type.

A subset of device capabilities can be determined through detection of other capabilities. For example, a detected device model designation can be used to look up details about hardware and software features (e.g., security capabilities) of the device. Similarly, the operating system and the version of an operating system can provide information around the possible features. The application can then check various features or function capabilities on the device through version queries, test function calls, and other approaches. The device capability profiler 120 preferably looks up data corresponding to detected information that might be linked to other security information (e.g., model numbers) in external databases; additionally or alternatively, the device capability profiler 120 may include a local lookup database.

A first capability may be the presence of a hardware security module (HSM). An HSM is a physical computing device that safeguards and manages digital keys. The HSM is preferably provided on the device. In another version, the HSM may be accessible on a networked device, such as one connected over Bluetooth, local intranet, the internet, or any suitable network. The HSM device preferably includes tamper protected data storage; additionally or alternatively, the HSM device may include tamper detection. A secure element can be one type of HSM, which is an encrypted chip or processor. The HSM is preferably specialized for data encryption management and resides on the main board of a computing device. The HSM stores keys in a protected storage solution. In many variations, the key may not be readable or obtainable from the HSM, and the HSM provides an interface to use a stored key such as to generate and output a signature made with the key.

A second capability may be a platform key management feature. In some instances, an operating system can provide a software based platform key management solution (e.g., a keychain feature). Passwords or content stored in the platform key management feature is encrypted when the device is locked or not authorized to provide that information.

A third type of capability can include the device usage protection capabilities. Usage protection capabilities can include a lock screen, a lock screen pin code or password, biometric authentication, and secondary device authentication. Other capabilities can include processor speed, key generation tools/libraries, and other capabilities that limit the types of keys that may be generated. Another capability of a device is presence of a trusted input and display unit, which is a separate computing unit operative on the device with at least one output to communicate with a user and at least one input to receive input from a user. The trusted input and display unit can be used as a separate gate when accessing an HSM, platform key management feature, or other key management tool. Similarly, device capabilities may include enabling use of a connected secondary device. A secondary device can be used in a mode of key management to increase security either by leveraging capabilities of the second device (e.g., increased processing speeds for larger keys) or as an additional factor to authorize use of a key on the device. Some examples of secondary devices include general-purpose devices (e.g., smartphones, tablets, etc.), dedicated authentication tokens (e.g., a pocket-sized disconnected token with an e-ink display), smartcards, and RFID tags. After collecting and processing capabilities of an individual device, the resulting capability assessment can be transmitted or synchronized with a centralized database of device capabilities possibly hosted with the remote server. The database of device capabilities can be used to facilitate subsequent capability assessments. The capability database is preferably distinct from any lookup databases, but additionally or alternatively, the capability and lookup databases may share data (or be the same database).

The remote server functions as a centralized host providing processing, storage, and/or data. In some implementations, the remote server is part of a parent computing platform with a different primary objective. For example, the parent computing platform can be a two-factor authentication as a service platform. The parent computing platform in some cases will host the public key corresponding to the private key storage on the device. As mentioned above, the remote server can additionally facilitate tasks such as key generation if the device instance delegates key generation to an outside device.

Figure 4:
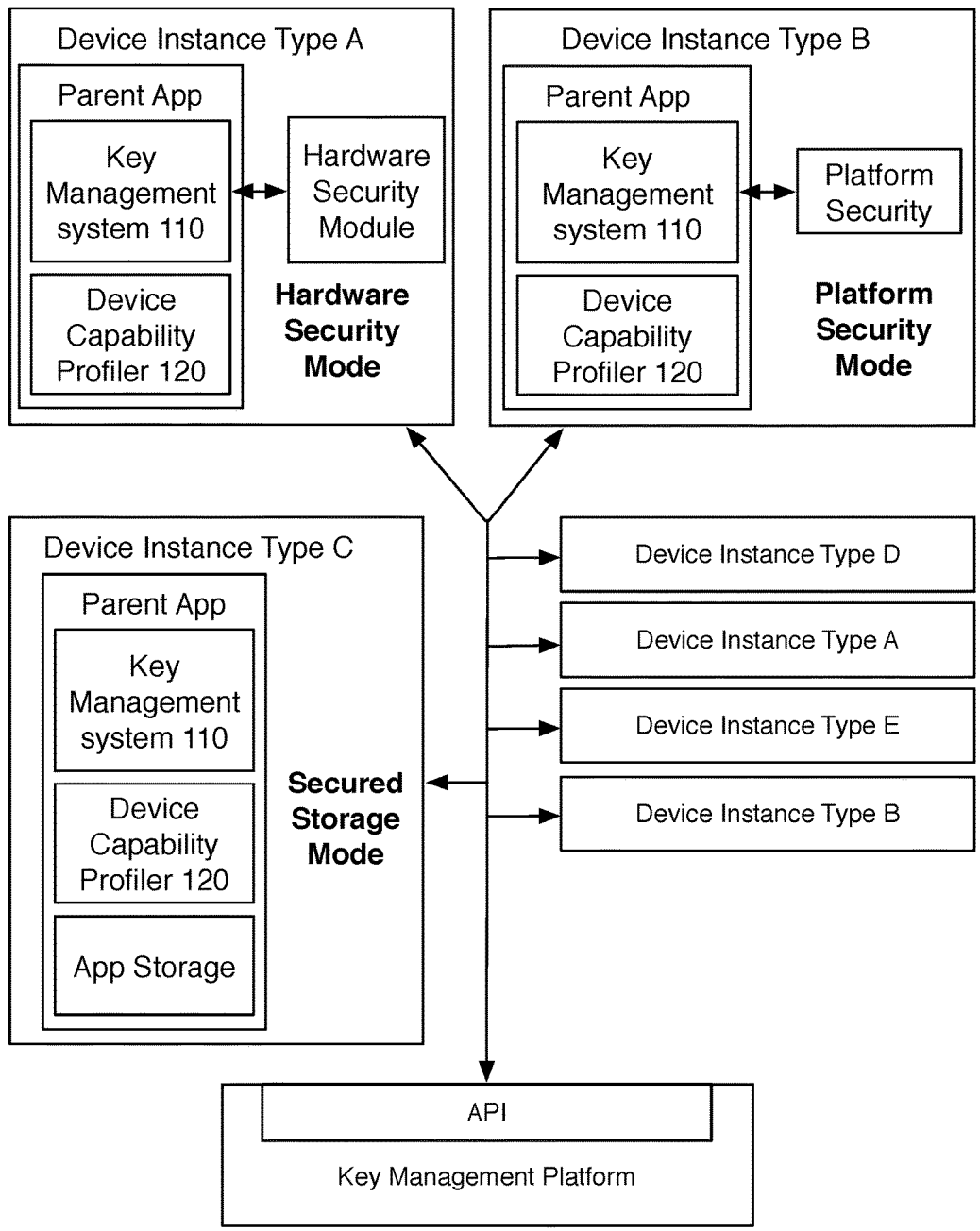
FIG. 4 is a schematic representation of a variation including a key management platform.

In one variation, the system is incorporated into a multi-tenant or multi-device instance platform. The platform is preferably a distributed computing system that can provide the services of the remote server and platform level services. The configuration, and key management state of a set of device instances, where each device may have a key management system 110 and a device capability profiler 120. The key management state can be synchronized and monitored through a network accessible interface. The device instances preferably communicate various key management decisions and state information to the key management platform. As shown in FIG. 4, a key management platform may be in an information state synchronized to the key management of a set of device instances. The key management system 110 or any suitable component preferably communicates device capabilities, selected key generation modes, key storage modes, key access permissions, or other suitable properties related to key management. The key management platform can function to provide a unified management interface for a set of device instances. For example, an enterprise entity may want to be able to see and possibly control the permissions of an account accessing their system according to the key management of devices. An administrator of a set of devices instances may be able to query the key management state of one or more device instances. Additionally, an administrator may be able to set account permissions based on key management of a device instance. For example, a key stored in secured storage of the device may be held valid while a key stored on-device may be changed to no longer be valid in response to an administrator control of the key management platform. The key management platform may include a programmatic API such as a REST API operable over an application layer protocol such as an HTTP-based protocol (HTTP/HTTPS) or SPDY. Other suitable protocols may alternatively be used. The API could alternatively be a SOAP API or any suitable type of API.

The secondary computing device can similarly be used to act as a delegate for particular key management tasks. The secondary computing device can be used in key generation, storage, and usage. In key generation, the secondary device may have better processing capabilities and can generate a key pair faster or more efficiently than the device instance. The key management system no requests a new key pair from the secondary computing device, and the secondary computing device generates the key and transmits a response. The secondary computing device will often have an application or service operative on the secondary device that is configured to communicate and cooperatively perform key management processes. The secondary computing device can communicate over a local Wi-Fi network, Bluetooth, an intranet, the internet, or any suitable communication channel. With storage, the secondary computing device may have more advanced storage capabilities—storage or partial storage of the key could be delegated to the device. As another use, a secondary computing device can be used as a factor of authentication to gate use of a key. Before accessing, using, or decrypting a key, the key management system no may require a confirmation request to be confirmed through the secondary computing device.

Examples of secondary computing devices include general-purpose computers, smartphones, tablets, laptops, media players, smart watches, and wearable electronics.

2. Method for Opportunistic Cryptographic Key Management

Figure 2:
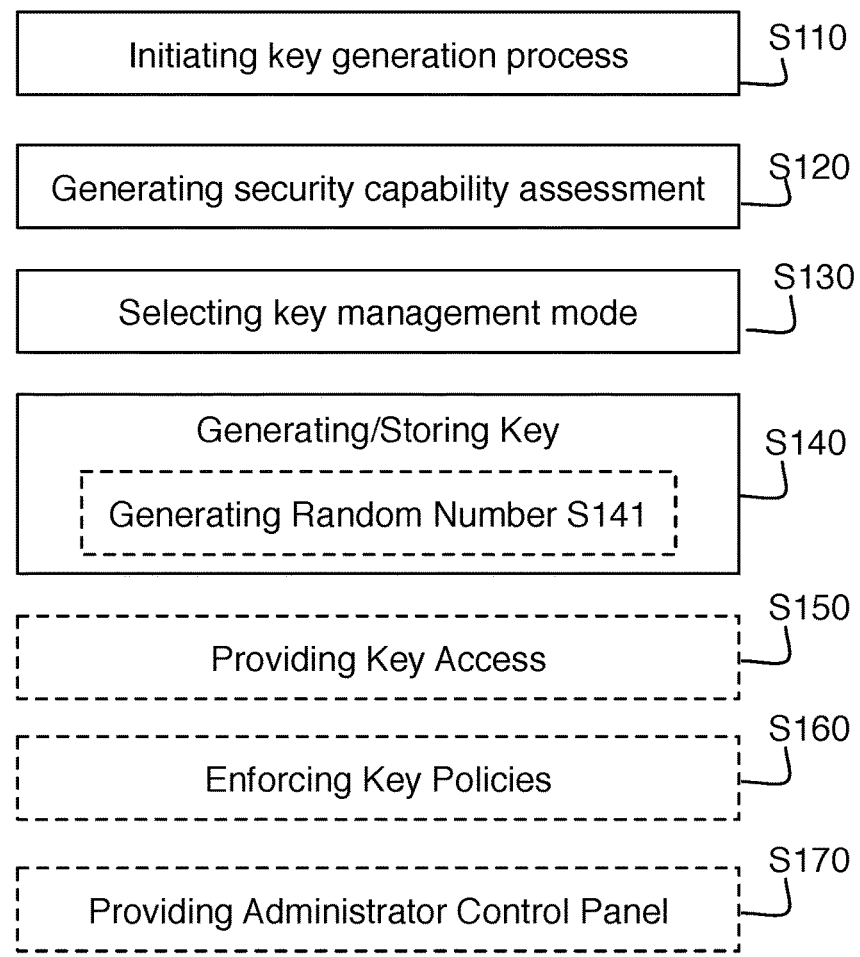
FIG. 2 is a chart representation of a method of a preferred embodiment.

As shown in FIG. 2, a method for opportunistic cryptographic key management on a device can include initiating a key generation process on a first device S110, generating a security capability assessment on the first device S120, selecting a key management mode S130 and generating and storing a key with the key management mode S140. The method may additionally include providing key access S150. The method functions to use an opportunistic approach to leverage varying security capabilities of a device. Various applications may have need of generating and storing a key locally on different device instances. The method enables keys to be stored on a wide variety of devices while taking advantage of security features of individual devices while selectively enabling appropriate precautionary measures.

The method is preferably used in the generation, storage, and use of at least one cryptographic key on a device. The cryptographic key is preferably a private key of an asymmetric key pair, but the cryptographic key can alternatively be the public key, a token, a certificate, or any suitable digital key to be stored on the device. In one exemplary use-case, the method may be employed along side a two-factor authentication system that stores a private key with a mobile application to enable use of the mobile device as a second factor of authentication. The method can additionally or alternatively be used with any suitable application that depends on the security of a token stored on a device.

Block S110, which includes initiating a key generation process on a first device, functions to prompt or trigger key management on the device. The key management is preferably facilitated and controlled by at least one component of an application on a device. The application is preferably an executable user application on a mobile computing operating system, but the application can alternatively be a background service. The key is preferably used in signing digital content with a private key accessible only to the user and/or device, but may additionally or alternatively be used for any suitable purpose. The key can be used to login a user, for authenticating authorship by a user, concealing transmitted information, or any suitable application of a cryptographic key. Initiating a key generation process can be in response to a user action within the application or could be in response to received communication. The received communication can be a message, an API request, or any suitable communication. In one implementation, an asymmetric key pair can be generated when a user is configuring a mobile device for use as a two-factor authentication device. In one variation, a generation request or instruction may include a parameter that defines a key management selection heuristic. The key management selection heuristic parameter can be a type, level or class identifier. The key management selection heuristic can alternatively be a set of properties used in generating a selection heuristic or can be any suitable element defining the selection heuristic. There can be different classifications of key management modes. In a general mode, a key is managed in a default key management mode that balances security and usability. In a secure mode, the key management mode selected in block S130 may prioritize security over usability (e.g., using slower but more secure key management practices). For example, encryption may be increased at the expense of speed, and increased user steps may be prioritized over more usable user steps. In a usability prioritized key management mode, the key management mode may prioritize usability. For example, options with faster encryption processes may be prioritized and key access authentication layers may be reduced to simplify usability. There can be any suitable number of classifications with any suitable combination of selection heuristics.

Block S120, which includes generating a security capability assessment on the first device, functions to collect, analyze, and assess information about the device to determine security capabilities. Block S120 preferably includes checking for a set of hardware capabilities, platform enabled capabilities, qualitative capabilities of a device (e.g., processing speed, storage, etc.), and/or secondary device capabilities and uses these capabilities to generate one or more capability assessments.

Capability assessments preferably include data about the set of capabilities possessed by an assessed device. Capability assessments may include data on the presence or lack of particular capabilities; additionally or alternatively, capability assessments may include data on the strength and/or magnitude of particular capabilities. Capability assessments may be formatted as a list, matrix, or any other type of data format or structure. Capability assessments may include aggregates of capability data or other processed capability data. Generating a security capability assessment can include running a set of targeted tests for a set of capabilities. A test could be command to evaluate how the device or application responds. Alternatively, generating a security capability assessment can include querying information from the device or detecting information of the device.

In one variation of a preferred embodiment, capability assessments include one or more security capability scores. Capability scores are preferably determined by evaluating capability data against a scoring metric; capability scores are preferably used as an indication of relative security strength (compared to other devices). Scoring metrics may be designed to assess security relative to any suitable reference; for example, a scoring metric might score capabilities of a smartphone on a scale from 1-10, where 10 is considered the preferred smartphone score. Alternatively, a scoring metric might score capabilities of a smartphone on a scale from 1-10, where 10 is considered a preferred security score. The use of scoring metrics based on different references allows security administrators to compare security scores both inter-device-type and intra-device-type.

A subset of device capabilities can be determined through detection of other information. For example, a detected device model designation can be used to look up details about hardware and software features (e.g., security capabilities) of the device. The process of determining device capabilities through intermediate information (e.g., by looking up a device number) is referred to as indirect capability determination. Similarly, the operating system and the version of an operating system can provide information around the possible features. The application can then check various features or function capabilities on the device through version queries, test function calls, and other approaches. Block S120 preferably includes looking up data corresponding to detected information that might be linked to other security information (e.g., model numbers) in external databases; additionally or alternatively, Block S120 may include using a local lookup database. A first capability may be the presence of a hardware security module (HSM). An HSM is a physical computing device that safeguards and manages digital keys. The HSM is preferably provided on the device. In another version, the HSM may be accessible on a networked device, such as one connected over Bluetooth, local intranet, the internet, or any suitable network. The HSM device preferably includes tamper protected data storage; additionally or alternatively, the HSM device may include tamper detection. A secure element can be one type of HSM, which is an encrypted chip or processor. The HSM is preferably specialized for data encryption management and resides on the main board of a computing device. The HSM stores keys in a protected storage solution. In many variations, the key may not be readable or obtainable from the HSM, and the HSM provides an interface to use a stored key such as to generate and output a signature made with the key. A second capability may be a platform key management feature. In some instances, an operating system can provide a software based platform key management solution (e.g., a keychain feature). Passwords or content stored in the platform key management feature is encrypted when the device is locked or not authorized to provide that information. A third type of capability can include the device usage protection capabilities. Usage protection capabilities can include a lock screen, a lock screen pin code or password, biometric authentication, and secondary device authentication. Other capabilities can include processor speed, key generation tools/libraries, and other capabilities that limit the types of keys that may be generated. Another capability of a device is presence of a trusted input and display unit, which is a separate computing unit operative on the device with at least one output to communicate with a user and at least one input to receive input from a user. The trusted input and display unit can be used as a separate gate when accessing an HSM, platform key management feature, or other key management tool. Similarly, device capabilities may include enabling use of a connected secondary device. A secondary device can be used in a mode of key management to increase security either by leveraging capabilities of the second device (e.g., increased processing speeds for larger keys) or as an additional factor to authorize use of a key on the device. Some examples of secondary devices include general-purpose devices (e.g., smartphones, tablets, etc.), dedicated authentication tokens (e.g., a pocket-sized disconnected token with an e-ink display), smartcards, and RFID tags. After collecting and processing capabilities of an individual device, the resulting capability assessment can be transmitted or synchronized with a centralized database of device capabilities possibly hosted with the remote server. The database of device capabilities can be used to facilitate subsequent capability assessments. The capability database is preferably distinct from any lookup databases, but additionally or alternatively, the capability and lookup databases may share data (or be the same database).

When processing an individual device, the resulting capability assessment can be transmitted or synchronized with a centralized database of device capabilities. In processing a subsequent second device, the database of device capabilities can be queried based on base information such as device model, operating system version, country, and/or any suitable property. Capability assessment data can be reused to either improve speed of capability assessment or to improve capability assessment.

Block S120 may occur in response to Block S110, but may additionally or alternatively at any other suitable time; for example, Block S120 may be performed during an initial setup on the device, such as when instantiating a key management system on a device instance (e.g., when opening an application for a first time), but may additionally or alternatively run at other times to assess any changes or in response to a change in the device capabilities. For example, Block S120 may run periodically.

Block S130, which includes selecting a key management mode, functions to select an approach to key management customized for the device. Selecting a key management mode is preferably based on the security capability assessment of a device instance. The key management mode includes key generation and key storage modes. Accordingly, Block S130 can include selecting a key generation mode S132 and a key storage mode S134. Key management modes preferably include key creation configuration data, key storage configuration data, key retrieval configuration data, and/or key usage configuration data. The selected key management mode preferably directs parameters of key management; e.g., what keys are generated, where keys are generated, how keys are generated, where/how keys are stored, and/or how keys are accessed.

Key management modes preferably define a balance of security and usability. The selection of the key management mode may operate with different selection heuristics. Rules may be configured to define a default prioritization of options. As described above, the prioritization may be dynamic based on the type of key generation request wherein selecting a key management mode can include dynamically selecting a key management mode according to an option prioritization. The option prioritization may be dynamically set according to specified directives, policy rules, or any suitable instruction. For one selection heuristic, the selected mode of key generation and storage preferably selects more advanced security measures when the capable features are available, but will default to alternative security measures to accommodate less capable devices. The selected mode can additionally factor in usability impact. As many implementations involve user interactions during use of the application, the mode of key management can strongly impact how a key is managed. Speed of the security measure can correlate with improved usability. Additionally, an inconvenience of performing additional steps may result in a poorer user experience. For example, the processor speeds and capabilities can determine the speed of generating a key of a set length. A device may use a key of smaller length or generate the key in an alternative approach if the device capabilities indicate slow processing speeds. The mode of key generation can also be based on additional parameters accompanying a key request. A parameter may indicate the security level preference of the key. A low security setting may give more weighting to usability over security, and a high security setting can result in enabling additional security mechanisms and possibly increasing a minimum security capability threshold.

The key management mode is preferably based on the security capability assessment of Block S120. Devices can differ based on available hardware or software functionality, and based on the system, application, or user configuration of the device; each of these differences has potential impact on the selection of key management modes. Additionally or alternatively, the key management mode may be selected in part or whole by manual configuration; e.g., parameters of key management may be set manually by users and/or administrators. Like access to particular keys, configuration access may be limited to particular persons or applications possessing appropriate credentials, and level of access may similarly be determined by credentials.

Figure 5:
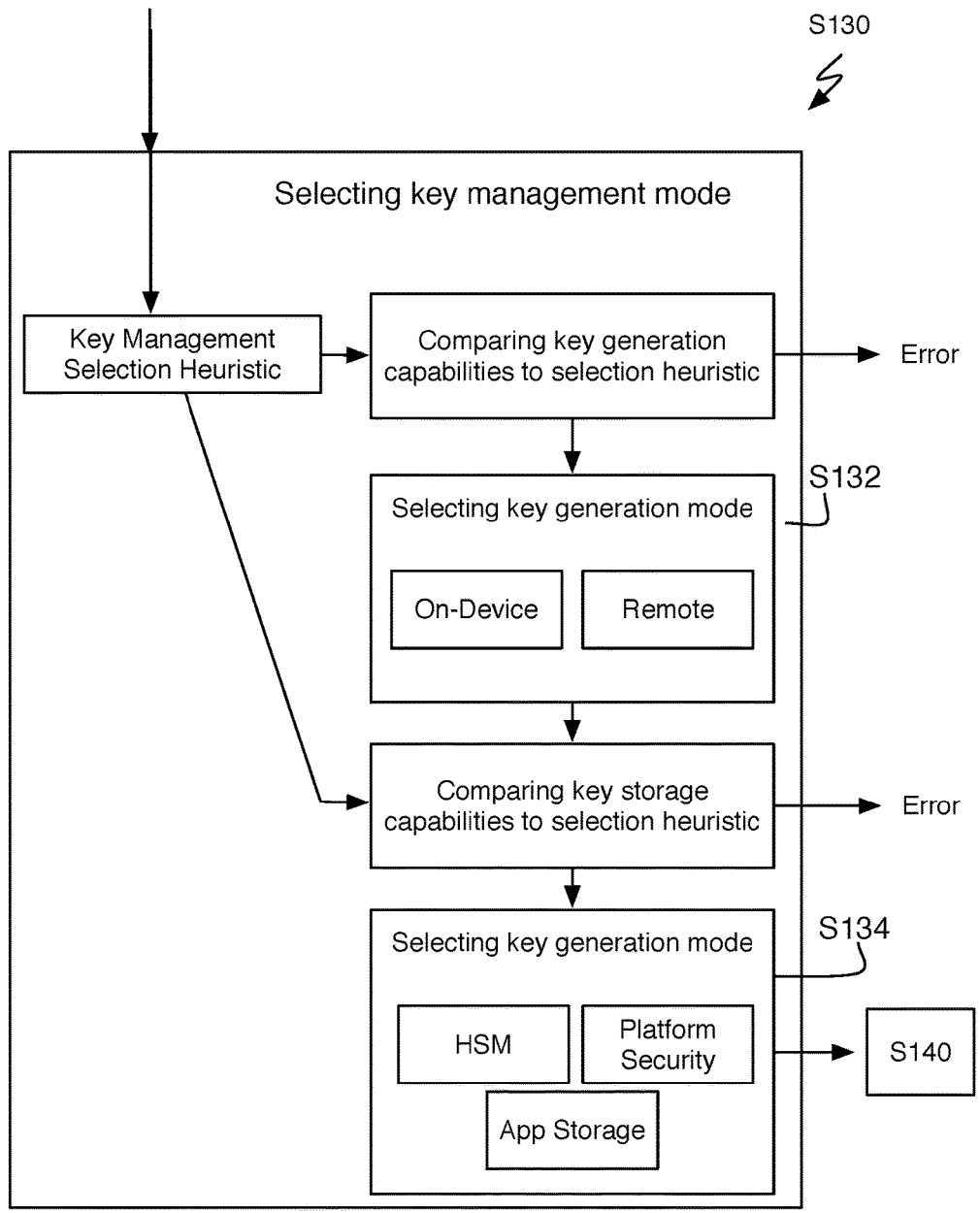
FIG. 5 is a schematic representation of selecting a key management mode.

In some instances, the security capability assessment results in the device not satisfying a minimum level of security. The method can include, upon detecting an inability to fulfill key management, issuing an error as shown in FIG. 5. The error may be a programmatic error or warning if the key generation was initiated from an instruction. The error may alternatively be an error response message transmitted as a reply or response to a key generation request. In the variation with a designated high-security selection heuristic, this may happen when a particular device cannot fulfill a high security key management mode. For example, a security key management mode may specify that a HSM is used to store the key, but a device may not include a HSM.

Block S140, which includes generating and storing a key with the selected mode of key generation and storage, functions to activate a key for use on a device. Generating and storing a key is preferably based on the selected key management mode. Generating and storing a key are preferably part of performing key maintenance. There can be various modes that can be selectively invoked depending on the security capabilities. Generating a key and storing/using a key can be independently set depending on the capabilities. Keys are preferably generated using key generation algorithms intended for asymmetric-key encryption algorithms (e.g., RSA), but may additionally or alternatively use key generation algorithms intended for symmetric-key encryption (e.g., DES and AES).

Generating a key preferably includes selecting the modes of on-device generation, cloud generation, and second device generation. The mode of on-device generation includes generating a key on the device, which can function to keep a key limited to only being readable from the device. A device will preferably have suitable processing capabilities to generate keys of a certain length. If the device does not possess the processing capability, key generation libraries, or other capabilities to complete the key generation in a timely manner, then an alternative mode of key generation may be used such as a mode of cloud generation or second device generation. The key size and complexity can additionally be modified according to the capabilities of a device. In a mode of cloud generation, the key is transiently generated on a remote server and transmitted to the device. The key is preferably not stored on the remote server. In one variation, the key request and delivery is communicated over HTTP/HTTPS, but any suitable communication protocol can similarly be used. In a similar variation, the mode of second device generation will use a secondary connected device to generate a key. The secondary device can be a second mobile device, a desktop computer, a wearable computer, and/or any suitable device. The second device is preferably accessible over a local Wi-Fi network, an intranet, Bluetooth, or an alternative local communication network. The second device may have better capabilities than those of the main device, and thus generate a better key more readably.

Block S140 may include generating a random number S141 as a seed or other component of the key generation process. Generating a random number preferably includes using random number generators (RNGs) or pseudo-random number generators (PRNGs) in the key generation process. If the electronic device operating the method includes a hardware RNG, this RNG is preferably used, but additionally or alternatively any suitable RNG or PRNG may be used. If the electronic device operating the method does not have a dedicated RNG, but is capable of providing potential RNG sources (e.g., radio noise, thermal noise), the RNG sources are preferably used to generate random numbers. If the electronic device operating the method does not have access to RNG sources, Block S141 preferably includes producing pseudo-random numbers using a PRNG. Additionally or alternatively, Block S141 may include obtaining random numbers from an external source (e.g., from an internet-connected random number generator).

Some or all of key generation computations may be offloaded to an external source (e.g., an internet-connected key generation server, or a locally connected key generator).

Storing a key can include various approaches depending on the capabilities of the device. The method preferably includes selecting between at least two of the following modes, and more preferably at least the hardware security mode, platform security mode, and application storage mode. Depending on how and where a key is stored, subsequent interactions with the stored key are updated according to the storage mode. The method can include a normalized interface for key usage such that use of the key will automatically invoke appropriate processes and user interactions. Depending on how a key is stored, accessing or using a key can be different. Use of keys can include additional user interaction steps based on the mode of key management.

Figure 3:
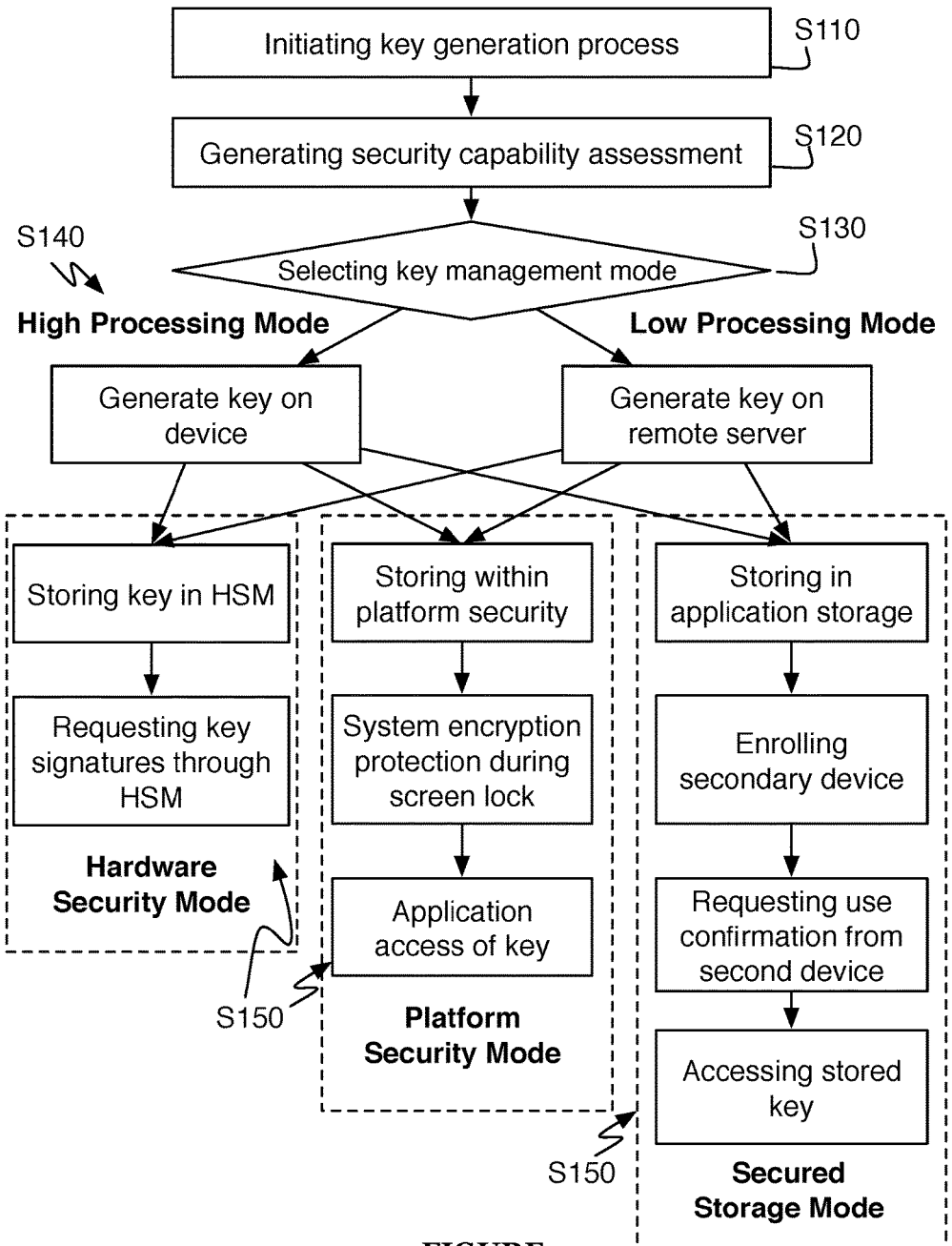
FIG. 3 is a flowchart representation of a method of a preferred embodiment.

As shown in FIG. 3, in a first mode (e.g., hardware security mode), the key is preferably stored in a hardware security model (HSM) as described above. The HSM cryptographically stores a key in a manner where the key is secured against retrieval. The HSM will preferably include an API or other suitable interface to programmatically add a key to the HSM. In subsequent usage of the key, the method will include performing cryptographic use of the key through the HSM. In one variation, the HSM stores the key such that a key cannot be directly accessed, and the HSM generates and supplies signatures and results of other cryptographic procedures of the stored key. When a key is stored according to the hardware security mode, the method can automatically enable use of the HSM for subsequent key operations. In one variation, the HSM can be connected to a trusted input and display unit that gates use of the HSM. The trusted input and display unit is a separate computing unit that functions independent of a main computing unit of the device. The display is a secondary separate display and is inaccessible from the main computing unit, and the at least one input mechanism is similarly inaccessible from the main computing unit. The trusted input and display unit displays an alert or message informing a user of any attempt to access and/or use a key. When a user confirms the attempt through the input mechanism, the trusted display and input unit enables the HSM to continue with the requested use of the key.

In a second mode (e.g., a platform security mode), a software-enabled secure storage or data encryption can be used to store information on the device. The device may provide a password or keychain management mechanism where content can be stored and is protected according to security features of the device. In one variation, data stored in the platform security component is encrypted when the device is locked, and can only be decrypted when successfully unlocked through an authorization challenge. The authorization challenge can be a pin code, a password, graphical password pattern, or any suitable unlock challenge. The authorization challenge can additionally or alternatively include biometric based challenges (e.g., finger print scanning, facial recognition, speaker recognition, eye scanning, and the like) or secondary authentication from a second device.

In a third security mode (e.g., secured storage mode), the key can be stored in a protected manner that requires authentication to access and/or use the key. An authorization challenge is implemented to prevent access of the key. The authorization challenges can include the password-based implementations, the biometric, and/or the additional device forms of authentication described above. The key can be stored in general device storage, sandboxed application storage, or any suitable storage. The authentication challenge can be implemented within the application managing the keys. In one variation, the authentication challenge depends on a remote server to facilitate authenticating requests.

In a fourth security mode (e.g., application storage mode), a key can be stored within a sandboxed or private storage location. The application storage can prevent other applications and services from accessing the key.

In a fifth security mode (e.g., device storage mode), can be used when sandboxed or application protected storage is not available, not relevant (e.g., single application devices), or otherwise not suitable.

In some variations, generation and storage of a key can be prevented if the device capabilities are determined to be insufficient. For example, generation and storage of a key may be prevented if a device's security capability score is below a threshold score. Likewise, generation and storage of a key may occur only if a device's security capability score is equal to or above a threshold score.

Block S150 includes providing key access. Block S150 functions to allow the use and/or retrieval of keys accessible to the device. Block S150 may allow direct access to keys (e.g., the unencrypted full key is retrievable), but may additionally or alternatively allow only indirect access to keys (e.g., the key may be used, but data is passed through the key management system such that the unencrypted key is not revealed). As another example, Block S150 may include allowing access to keys by creating an encrypted version of the key that may be used by persons or applications with appropriate credentials.

Key access may be determined by user or application credentials; e.g., a certain set of credentials may allow direct access to the keys stored in the key management system, while another set of credentials may allow only indirect access to the same keys. Access may be similarly limited to particular sets of keys; e.g., a first set of credentials can access all keys stored in the key management system, while another set of credentials can access only a subset of keys. Additionally, access may be limited to certain types of access; for example, keys may be allowed to be transmitted only over encrypted connections. Key access may be enabled by allowing for the transmission of keys to apps on the device; additionally or alternatively, key usage may be enabled in any suitable manner (e.g., performing encryption/decryption within a parent app).

Key access can be performed according to the device capabilities. As mentioned above, the access and use of a key may be based on the mode in which the key was stored. Authentication challenges can be selectively put in place in front of any key access method. In one variation, a secondary device is used in enabling access and use of a key. The secondary device functions to gate use of the key through a decoupled operating system. The decoupled operating system in some cases can be operative within the same device. The decoupled operating system in one variation can be a trusted display and input unit. The decoupled operating system in a second variation can be a second mobile device, a wearable computing device, a desktop computer, or any suitable device.

Additionally or alternatively, selecting a mode of key generation and storage can trigger setting a policy of the key, which functions to apply key usage rules according to enabled and used cryptographic key management. The method can additionally include enforcing key policies S160. Setting a policy of the key can include setting capabilities or permissions of the key, confirmation or authentication procedures, and/or any suitable policy. Capabilities and permissions can include setting a security measure of the key and selectively allowing and disallowing use of the keys according to the security measure. For example, a first key stored on an HSM and secured on a device with biometric based unlock feature can have a highly trusted security measure. A second key stored on a device that stores a key within application storage and with no unlock feature can have a security measure indicating low trust. The first key can be used to provide authentication for more actions than the second key. In one variation of a preferred embodiment, the security measure of a particular key may be checked against thresholds to determine the level of access granted to that key. In a two-factor authentication application, this may allow general login actions with both keys but only allow profile changes with the first key. In a financial instrument application, the first key can be used in financial transactions with fewer restrictions while the second key may be limited in the rate or size of a financial transaction. The second key may also require entering a pin code to be used or may require or prompt higher levels of fraud protection.

The method can additionally include providing an administrator control panel S110, which functions to enable an administrator to augment the security measures when creating and storing keys and/or reviewing security levels of keys. When augmenting security measures, an administrator control panel is alerted to a key generation or storage request event, and the administrator can select various options to direct key management of this key instance. The capabilities and the recommended mode of key management can be displayed to guide an administrator's course of action. The administrator may be required to confirm, cancel, or change the mode of key management. Additionally, an administrator can review the status of keys and the manner in which they keys have been stored.

Figure 6:
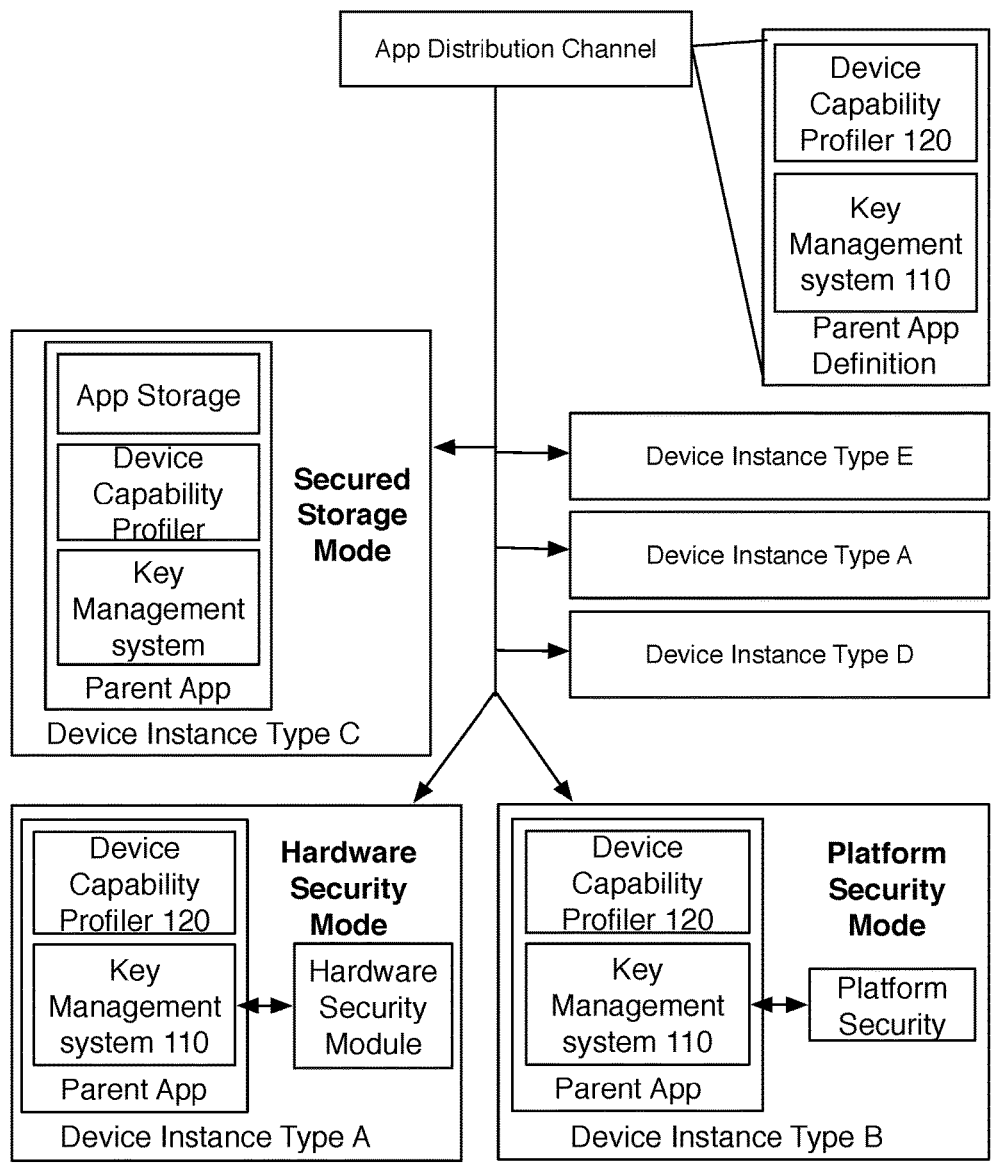
FIG. 6 is a schematic representation of distributing an opportunistic key management application to a variety of device types.

In one implementation, the method further includes configuring the processes of the above method in application logic and distributing to a set of distinct devices as shown in FIG. 6. The application logic when executed on any device of the set of distinct devices can dynamically execute key management in a manner appropriate for the particular device.

The system and method of the preferred embodiment and variations thereof can be embodied and/or implemented at least in part as a machine configured to receive a computer-readable medium storing computer-readable instructions. The instructions are preferably executed by computer-executable components preferably integrated with the key management system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for cryptographic key generation, the method comprising:
   configuring a computing device to:
      (a) select a cryptographic key generation mode among a plurality of cryptographic key generation modes, wherein the plurality of cryptographic key generation modes includes, at least, a first cryptographic key generation mode and a second cryptographic key generation mode, wherein the first and second cryptographic key generation modes are different, and
      (b) execute a cryptographic key generation according to the selected cryptographic key generation mode;
   performing, by the computing device, a self-assessment of capabilities of the computing device to generate a cryptographic key that is useable by the computing device, wherein the self-assessment indicates a level of cryptographic key generation of a plurality of levels of cryptographic key generation, wherein performing the self-assessment by the computing device includes:
      analyzing hardware compute processing capabilities and/or software computing features of the computing device, and
      using results of the analyzing to generate a cryptographic key generation capability level of the computing device; and
   identifying a minimum-security capability threshold, wherein:
      (i) when the cryptographic key generation capability level satisfies the minimum-security capability threshold, selecting by the computing device the first cryptographic key generation mode, and
      (ii) when the cryptographic key generation capability level does not satisfy the minimum-security capability threshold, selecting by the computing device the second cryptographic key generation mode; and
   generating the cryptographic key according to the selected cryptographic key generation mode.

2. The method of claim 1, wherein:
   the first cryptographic key generation mode comprises an on-device cryptographic key generation mode, the on-device cryptographic key generation mode enabling the computing device to generate the cryptographic key using one or more hardware components of the computing device; and
   the second cryptographic key generation mode comprises a remote key generation mode, the remote key generation mode enabling the computing device to use one or more hardware components of a remote computing device to generate the cryptographic key.

3. The method of claim 2, wherein:
   the remote key generation mode includes using one of:
      an external computing device that is communicatively coupled to the computing device via a local communication network, and
      a remote computing server that is in operable communication with the computing device via a network.

4. The method of claim 3, wherein:
   the remote computing server comprises a component of multi-factor authentication service platform, wherein the remote computing server includes computer processing capabilities for remote generating cryptographic keys.

5. The method of claim 1, further comprising:
   identifying, at the computing device, a cryptographic key generation request, wherein the cryptographic key generation request includes the minimum-security capability threshold.

6. The method of claim 5, further comprising:
   using the key generation request to set the minimum-security capability threshold that is referenced in selecting the first or the second cryptographic key generation modes.

7. The method of claim 1, further comprising:
   identifying, at the computing device, a cryptographic key generation request, wherein the cryptographic key generation request includes an option prioritization used for dynamically selecting the first or the second cryptographic key generation modes, wherein the option prioritization indicates a priority for selecting available cryptographic key generation options available to the computing device.

8. The method of claim 7, further comprising:
   selecting the cryptographic key generation mode using (i) the results of the analyzing and (ii) the option prioritization included with the cryptographic key generation request.

9. The method of claim 1, wherein performing the self-assessment further includes:
   analyzing platform-enabled key management capabilities of the computing device, the platform-enabled key management capabilities includes one or more security features enabled by an operating system of the computing device that operate to protect a generated cryptographic key.

10. The method of claim 1, wherein performing the self-assessment further includes:
    analyzing device usage protection capabilities of the computing device, the device usage protection capabilities include one or more authentication features implemented by the computing device for using the computing device.

11. The method of claim 1, wherein:
    each of the plurality of selectable cryptographic key generation modes includes cryptographic key creation configuration data that defines one or more parameters for generating the cryptographic key, and
    wherein the one or more parameters define where the cryptographic key is generated and a cryptographic key type to be generated, wherein the cryptographic key type includes one of an asymmetric key and a symmetric key.

12. The method of claim 1, wherein:
selecting, by the computing device, the second cryptographic key generation mode includes selecting cryptographic key generation by a remote computing server,
generating the cryptographic key includes generating the cryptographic key at the remote computing server, and
in response to successfully generating the cryptographic key at the remote computing server, the remote computing server transmits, via a network, the cryptographic key to the computing device.

13. The method of claim 1, wherein:
selecting, by the computing device, the second cryptographic key generation mode includes selecting cryptographic key generation by an external computing device, the external computing device being in operable communication with the computing device via a local communication network,
generating the cryptographic key includes generating the cryptographic key at the external computing device, and
in response to successfully generating the cryptographic key at the external computing device, the external computing device transmits, via the local communication network, the cryptographic key to the computing device.

14. The method of claim 1, wherein:
generating the cryptographic key includes:
generating, by a hardware random number generator of the computing device, a random number to be used as a seed for generating the cryptographic key.

15. The method of claim 5, wherein:
a generation of the cryptographic key generation request is triggered in response configuring the computing device for use as a secondary authentication device in a multi-factor authentication of a user.

16. The method of claim 1, wherein:
generating the cryptographic key includes generating an asymmetric cryptographic key pair including a private cryptographic key and a public cryptographic key defining a private/public cryptographic key pair, and
the method further comprises:
storing, at the computing device, the private cryptographic key of the private/public cryptographic key pair; and
transmitting the public cryptographic key of the private/public cryptographic key pair to a remote multi-factor authentication service.

17. The method of claim 1, wherein:
generating the cryptographic key includes generating a symmetric cryptographic key, and
the method further comprises:
storing, at the computing device, a copy of the symmetric cryptographic key; and
transmitting a copy of the symmetric cryptographic key of the to a remote multi-factor authentication service.

18. The method of claim 1, further comprising:
during an instantiation of a cryptographic key management system on the computing device, performing the self-assessment of capabilities of the computing device by a device capability profiler of the cryptographic key management system.

19. A method for cryptographic key storage, the method comprising:
configuring a computing device to:
(a) select a cryptographic key storage mode among a plurality of cryptographic key storage modes, wherein the plurality of cryptographic key storage modes includes, at least, a first cryptographic key storage mode and a second cryptographic key storage mode, wherein the first and second cryptographic key storage modes are different, and
(b) execute a cryptographic key storage according to the selected cryptographic key storage mode;
performing, by the computing device, a self-assessment of capabilities of the computing device to store a cryptographic key that is useable by the computing device, wherein the self-assessment indicates a level of cryptographic key storage of a plurality of levels of cryptographic key storage, wherein performing the self-assessment by the computing device includes:
analyzing hardware compute storage capabilities and/or software storage features of the computing device, and
using results of the analyzing to generate a cryptographic key storage capability level of the computing device; and
identifying a minimum-security capability threshold, wherein:
(i) when the cryptographic key storage capability level satisfies the minimum-security capability threshold, selecting by the computing device the first cryptographic key storage mode, and
(ii) when the cryptographic key storage capability level does not satisfy the minimum-security capability threshold, selecting by the computing device the second cryptographic key storage mode; and
storing the cryptographic key according to the selected cryptographic key storage mode.

20. A system for cryptographic key generation and storage with a limited computing device, the system comprising:
a multi-factor authentication service;
a cryptographic key management system, wherein the cryptographic key management system enables a computing device to dynamically select a cryptographic key generation mode and a cryptographic key storage mode;
a device capability profiler that tests and analyzes attributes and cryptographic key generation and storage capabilities of the computing device to determine capabilities of the computing device for generating and storing a cryptographic key, wherein:
(i) during an instantiation of the key management system on the computing device, determining a cryptographic key capability level among a plurality of cryptographic key capability levels of the computing device;
(ii) using a key generation request to determine a minimum cryptographic key capability level threshold, wherein the key generation request includes the minimum cryptographic key capability level threshold;
(iii) when the cryptographic key capability level satisfies the minimum cryptographic key capability level threshold, selecting by the computing device a first cryptographic key generation and storage mode, wherein the first cryptographic key generation mode comprises generating and/or storing a cryptographic key using the computing device;
(iv) when the cryptographic key capability level does not satisfy the minimum cryptographic key capability level threshold, selecting by the computing device the second cryptographic key generation and storage mode, wherein the second cryptographic key generation mode comprises generating and/or storing the cryptographic key using a remote computing device; and (v) generating and storing the cryptographic key according to the selected cryptographic key storage mode.

\* \* \* \* \*